US008852702B2

(12) United States Patent
Kurihara et al.

(10) Patent No.: US 8,852,702 B2
(45) Date of Patent: Oct. 7, 2014

(54) LABEL

(75) Inventors: Eizo Kurihara, Kanagawa (JP); Katsumi Sakamaki, Kanagawa (JP); Mario Fuse, Kanagawa (JP); Shoji Yamaguchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 223 days.

(21) Appl. No.: 13/287,433

(22) Filed: Nov. 2, 2011

(65) Prior Publication Data

US 2012/0295055 A1 Nov. 22, 2012

(30) Foreign Application Priority Data

May 18, 2011 (JP) ................................ 2011-111772

(51) Int. Cl.

*B32B 9/04* (2006.01)
*B32B 33/00* (2006.01)
*B65D 65/30* (2006.01)
*G09F 3/10* (2006.01)
*G09F 3/02* (2006.01)

(52) U.S. Cl.

CPC .. *G09F 3/02* (2013.01); *G09F 3/10* (2013.01); *G09F 2003/0267* (2013.01); *Y10S 428/90* (2013.01)

USPC ........ 428/40.1; 428/689; 428/692.1; 428/900

(58) Field of Classification Search

CPC ........ C09J 7/02; C09J 7/0207; C09J 2201/20; G09F 3/02; G09F 3/10; G09F 7/04; G09F 2003/0267; G09F 2003/0264; G09F 2003/0266; G09F 2003/0269

USPC .......... 428/40.1, 692.1, 800–848.9, 900, 411, 428/689, 343, 344, 354; 253/449, 439, 487, 253/493

See application file for complete search history.

(56) References Cited

U.S. PATENT DOCUMENTS

| | | | | |
|---|---|---|---|---|
| 3,885,334 | A * | 5/1975 | Banks | 40/638 |
| 4,568,921 | A * | 2/1986 | Pokalsky | 340/572.3 |
| 7,033,657 | B2 * | 4/2006 | Martin | 428/43 |
| 7,790,259 | B2 * | 9/2010 | Wu et al. | 428/40.1 |
| 2008/0013212 | A1 * | 1/2008 | Fuse et al. | 360/131 |
| 2010/0117349 | A1 * | 5/2010 | Ivutin et al. | 283/81 |

FOREIGN PATENT DOCUMENTS

| | | |
|---|---|---|
| JP | A-10-69223 | 3/1998 |
| JP | A-2005-145023 | 6/2005 |

* cited by examiner

*Primary Examiner* — Patricia L Nordmeyer
(74) *Attorney, Agent, or Firm* — Oliff PLC

(57) ABSTRACT

A label includes a belt-like label body having a base and an adhesion layer provided on one surface of the base, a linear magnetic material arranged in the label body along a longitudinal direction of the label body, and plural cut portions provided by cutting the label body and the magnetic material along a width direction of the label body except for a portion of the label body in the width direction, and provided at intervals in the longitudinal direction of the label body.

12 Claims, 12 Drawing Sheets

LABEL

CROSS-REFERENCE TO RELATED APPLICATIONS

This application is based on and claims priority under 35 USC 119 from Japanese Patent Application No. 2011-111772 filed May 18, 2011.

BACKGROUND

Technical Field

The present invention relates to a label.

SUMMARY

According to an aspect of the invention, there is provided a label including: a belt-like label body having a base and an adhesion layer provided on one surface of the base; a linear magnetic material arranged in the label body along a longitudinal direction of the label body; and plural cut portions provided by cutting the label body and the magnetic material along a width direction of the label body except for a portion of the label body in the width direction, and provided at intervals in the longitudinal direction of the label body.

BRIEF DESCRIPTION OF THE DRAWINGS

Exemplary embodiments of the present invention will be described in detail based on the following figures, wherein.

DETAILED DESCRIPTION

Exemplary embodiments of the invention will be described below. The present exemplary embodiments are examples that carry out the invention and the invention is not limited to the present exemplary embodiments. In addition, members that have substantially the same functions and actions are designated and described by the same signs through all the drawings, and redundant description is omitted.

First Embodiment

Figure 1:
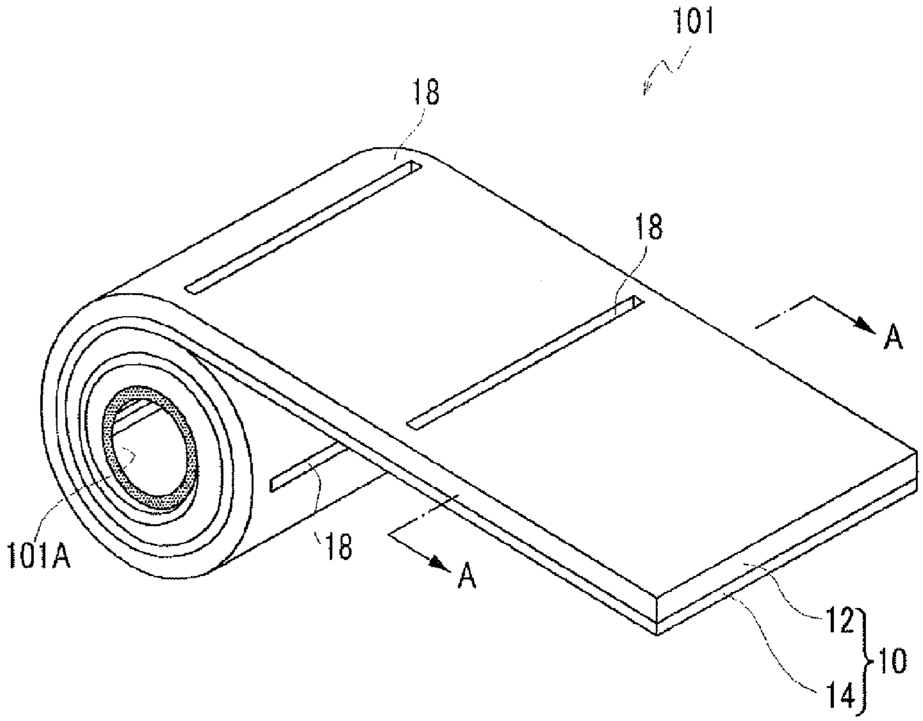
FIG. 1 is a perspective view showing a label related to a first exemplary embodiment.
Figure 2:
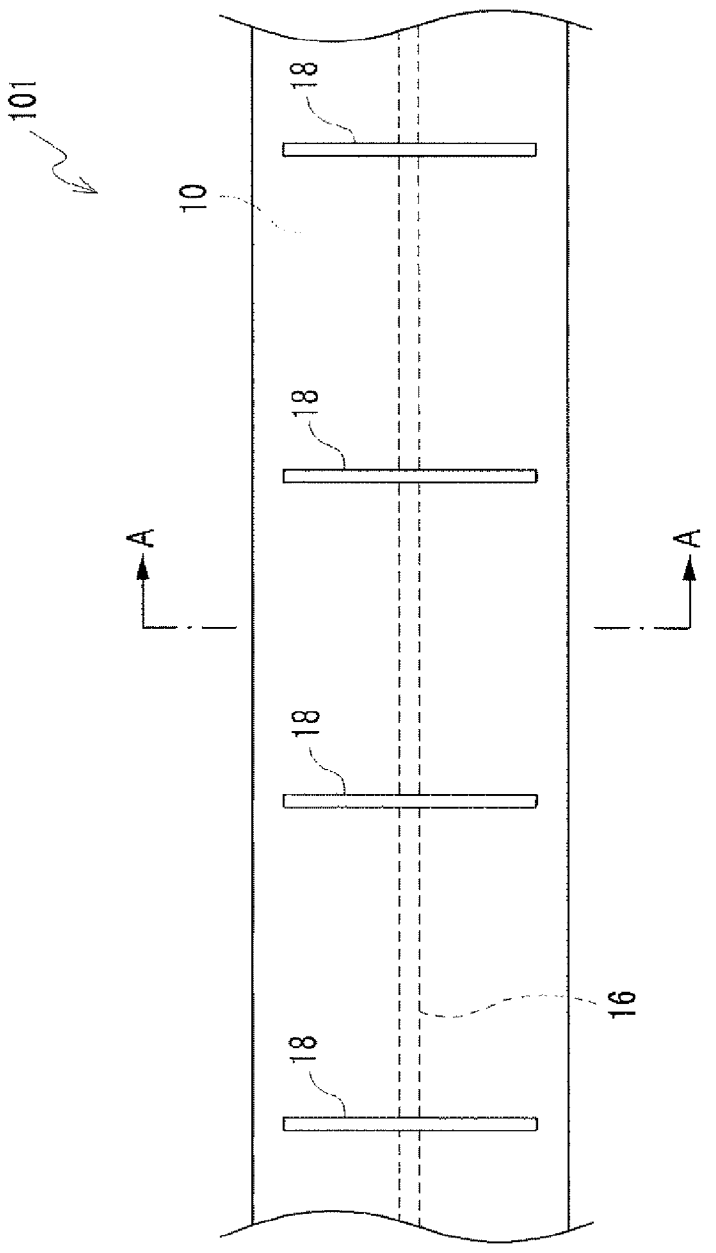
FIG. 2 is a plane view showing the label related to the first exemplary embodiment.
Figure 3:
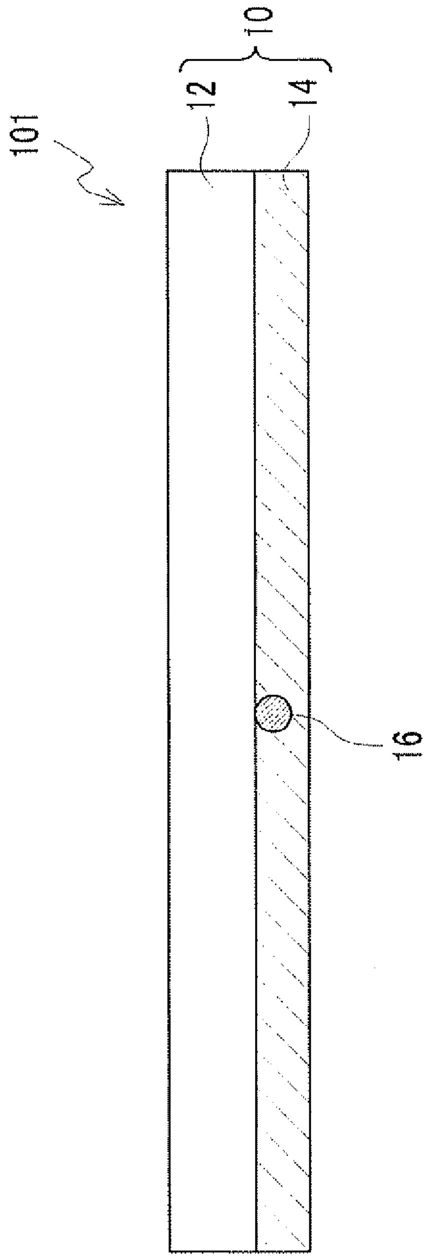
FIG. 3 is a cross-sectional view showing a label related to the first exemplary embodiment.

FIG. 1 is a perspective view showing a label related to a first exemplary embodiment. FIG. 2 is a plane view showing the label related to the first exemplary embodiment. FIG. 3 is a cross-sectional view showing the label related to the first exemplary embodiment.

In addition, FIG. 3 is equivalent to the A-A cross-sectional view of FIGS. 1 and 2.

As shown in FIGS. 1 to 3, a label 101 related to a first exemplary embodiment includes, for example, a belt-like label body 10, and a linear magnetic material 16 (hereinafter referred to as a magnetic wire 16) arranged in the label body 10 along the longitudinal direction of the label body 10.

The label 101 has a cut portion 18 provided by cutting the label body 10 and the magnetic wire 16.

In addition, although the label 101 related to the present exemplary embodiment shows, for example, a roll form in which the label 101 is wound around a core body 101A in the shape of a roll, the label is not limited thereto, and may have a sheet-like form that is cut out to a target length.

Respective constituent elements of the label 101 related to the present exemplary embodiment will be described below.

The label body 10 related to the present exemplary embodiment has, for example, a base 12 and an adhesion layer 14 provided on one surface of the base 12.

The cut portion 18 related to the present exemplary embodiment will be described.

The cut portion 18 is provided so as to cut the label body 10 and the magnetic wire 16 along the width direction of the label body 10, except for both ends of the label body 10 in the width direction (that is, a direction that crosses the longitudinal direction of the label body 10 or the arrangement direction of the magnetic wire 16).

That is, the cut portion 18 is provided so as to cut the label body 10 and the magnetic wire 16 at the central portion of the label body 10 in the width direction, for example, along the width direction of the label body 10.

In addition, the length (the length of the label body 10 along the width direction) of the cut portion 18 may be $0.1\times L$ or more and $0.8\times L$ or less (desirably $0.2\times L$ μm or more and $0.7\times L$ μm or less), for example, when the width of the label body 10 is L (mm).

Such cut portions 18 are plurally provided at intervals in the longitudinal direction (that is, the direction that crosses the arrangement direction of the magnetic wire 16) of the label body 10.

The interval between the cut portions 18 includes, for example, a range of 15 mm or more and 400 mm or less (desirably 25 mm or more and 300 mm or less), and is determined according to the size (length along the longitudinal direction of the label 101) of a label 101 to adhere when adhering to an adhesion target.

That is, the cut portion 18 is provided, for example, at a position where the label 101 is cut out when adhering to an adhesion target.

In addition, the interval between the cut portions 18 may be constant.

The base 12 related to the present exemplary embodiment will be described.

The base 12 includes, for example, a base made of resin and a base made of paper.

The base 12 may have optical transparency or may have optical non-transparency. Here, the optical transparency means transmitting 60% or more of visible light.

When the base 12 has the optical transparency, there is an advantage that the magnetic wire 16 included in the label body 10 is made visible intentionally and positively, and when the base 12 has the non-transparency, there is an advantage that the magnetic wire 16 included in the label body 10 is not easily made visible.

The base 12 made of resin includes, for example, bases configured to include polyester resin, polyethylene terephthalate resin, polystyrene resin, polyolefin resin, polypropylene resin, and the like.

On the other hand, the base 12 made of paper includes, for example, plain paper, kraft paper, recycled paper, coated paper, and the like. The basis weight of the base 12 made of paper includes, for example, a range of 50 g/$m^2$ or more and 180 g/$m^2$ or less.

An internal additive may be blended with the base 12 made of paper. The internal additive to blend is not particularly limited, and includes, for example, organic and inorganic particles.

For example, various chemicals, such as a sizing agent, may be internally added or externally added to the base 12 made of paper.

The type of the sizing agent includes, sizing agents, such as a rosin-based sizing agent, a synthetic sizing agent, a petroleum-resin-based sizing agent, and a neutral sizing agent.

For example, a paper strong agent may be internally added or externally added to the base 12 made of paper.

In addition, the base 12 made of paper may use various agents, such as a dye and a pH adjuster, which are blended with usual paper medium, besides the above.

The adhesion layer 14 related to the present exemplary embodiment will be described.

The adhesion layer 14 is composed of adhesive.

The adhesive includes, for example, various kinds of adhesives, such as an acrylic adhesive, a polyester adhesive, an urethane adhesive, a silicone adhesive, a crude-rubber adhesive, and a synthetic-rubber adhesive.

The thickness of the adhesion layer 14 includes, for example, a range of 2 μm or more and 40 μm or less. Additionally, the amount of coating of the adhesion layer 14 (amount in terms of solid content) includes, for example, a range of 5 g/$m^2$ or more and 40 g/$m^2$ or less per surface of the base 12.

The magnetic wire 16 related to the present exemplary embodiment will be described.

The magnetic wire 16, for example, is linearly arranged in the label body 10 along the longitudinal direction of the label body 10, in a shape seen from the thickness direction of the label body 10 (the direction orthogonal to the principal surface of the label body 10) (refer to FIG. 2).

The magnetic wire 16, for example, is arranged so as to be buried in the adhesion layer 14. The magnetic wire 16, for example, may be arranged at the central portion of the adhesion layer 14 in the thickness direction, or is located on the base 12 side or on the side opposite to the base 12. In the present exemplary embodiment, the magnetic wire 16 shows a form that is located on the base 12 side and is buried in the adhesion layer 14.

Figure 4:
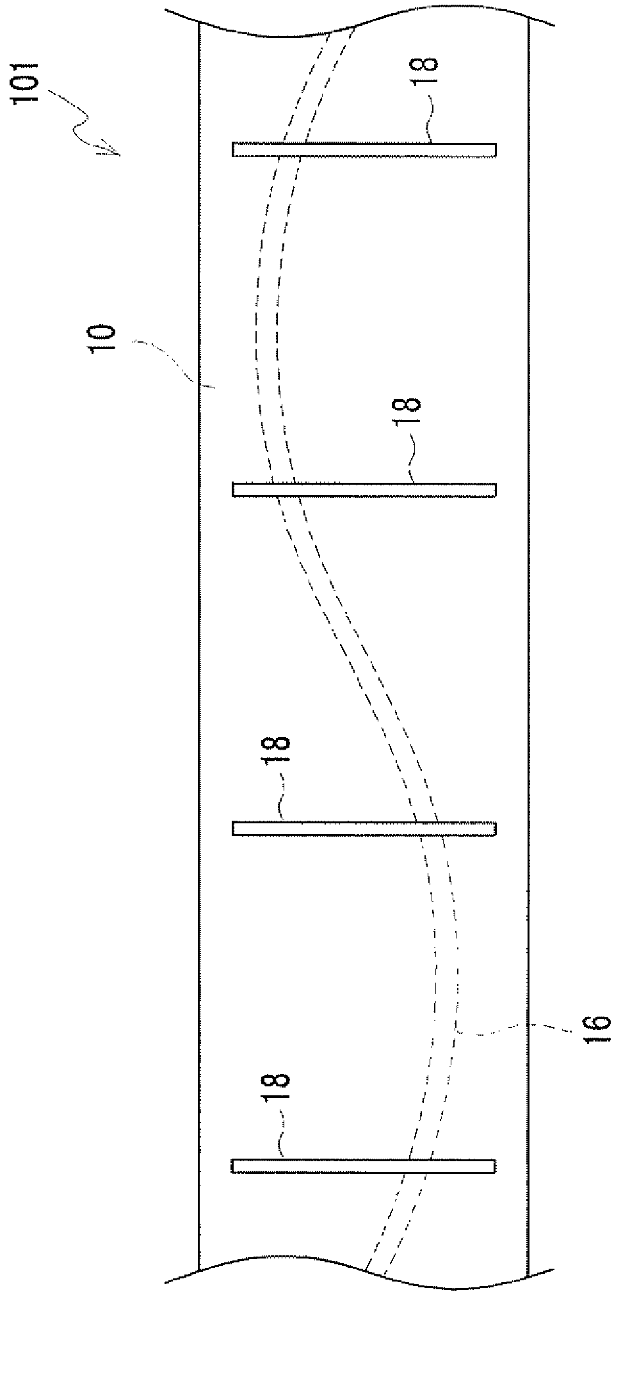
FIG. 4 is a plane view showing another label related to the first exemplary embodiment.

The magnetic wire 16 is not limited to the linearly arranged form, and, for example, as shown in FIG. 4, is arranged in a bent or curved manner (a form which is arranged in a curved manner is shown in FIG. 4) along the longitudinal direction of the label body 10, in a shape seen from the thickness direction of the label body 10 (the direction orthogonal to the principal surface of the label body 10). In addition, when the magnetic wire 16 is arranged in a bent or curved manner, a cycle in which the magnetic wire is bent or curved may be regular or may be irregular.

Thereby, when the label 101 is formed into a roll in a state where the label is wound and overlapped or the sheet-like label 101 is brought into an overlapped state, the positions of the magnetic wire 16 in the width direction of the label body 10 readily become different in the labels 101 in the overlapped state. Therefore, an increase in thickness is suppressed.

That is, the magnetic wire 16 may be arranged in a bent or curved manner such that the positions (the positions of the label body 10 in the width direction) of the magnetic wire 16 in adjacent cut portions 18 among the plural cut portions 18 provided in the label body 10 is different.

Thereby, when the cut portion 18 is formed by a cut member (for example, cutter or the like), the magnetic wire 16 are cut. However, since the number of times the magnetic wire 16 contacts the same position of an edge (for example, cutter or the like) of the cut member decreases, edge nicking of the cut member (for example, cutter or the like) is also suppressed.

Figure 5A:
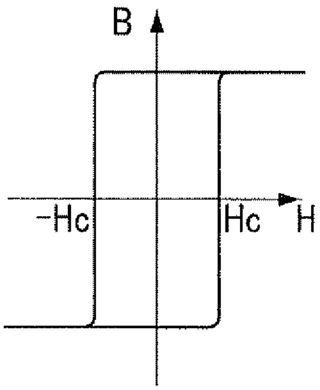
FIGS. 5A to 5C are schematic views for describing a large Barkhausen effect.
Figure 5B:
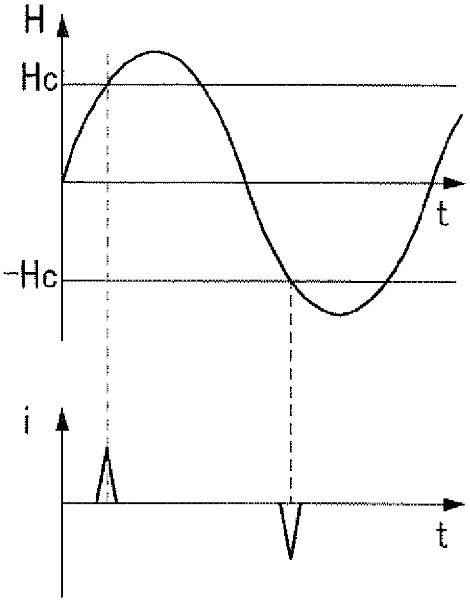
Figure 5C:
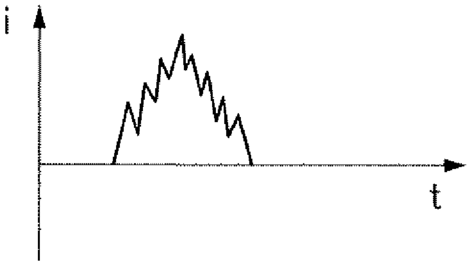

The magnetic wire 16 has a large Barkhausen effect. Here, the large Barkhausen effect will be simply described. FIGS. 5A to 5C are schematic views for describing the large Barkhausen effect. The large Barkhausen effect is a phenomenon in which steep magnetization reversal occurs when B-H (magnetic flux density-magnetic field) characteristics shown in FIG. 5A, that is, the hysteresis loop is oblong, and a material having a comparatively small coercive force (Hc), for example, an amorphous magnetic material constituted by Co—Fe—Ni—B—Si, is placed in an alternating magnetic field.

For this reason, when an alternating current is caused to flow through an exciting coil, thereby generating an alternating magnetic field, and the magnetic material is placed in the alternating magnetic field, a pulse-like current flows into a detection coil arranged around the magnetic material at the time of magnetization reversal.

For example, when the alternating magnetic field shown at the upper level of FIG. 5B is generated by the exciting coil, a pulse current shown at the lower level of FIG. 5B flows into the detection coil.

However, the alternating current induced by the alternating magnetic field also flows to the current that flows to the detection coil, and the pulse current is detected as being overlapped on this alternating current. Additionally, when a matter including the plural magnetic materials is placed in the alternating magnetic field, plural pulse currents are overlapped on each other, and a current shown in FIG. 5C is detected.

As such, when the "adhesion target to which the label 101 including the magnetic wire 16 has adhered" is placed in a magnetic field, a carrying-out prohibition or restriction state is given by adhering the label 101 including the magnetic wire 16 to the adhesion target in order to detect an electric signal (for example, a pulse signal shown in FIGS. 5A to 5C) generated in the magnetic wire 16 using a detecting device.

The magnetic wire 16 generally includes permanent magnets, for example, a permanent magnet having a rare-earth-based neodium (Nd)-iron (Fe)-boron (B) as principal components, a permanent magnet having samarium (Sm)-cobalt (Co) as principal components, a permanent magnet having an alnico-based aluminum (Al)-nickel (Ni)-cobalt (Co) as principal components, a permanent magnet having a ferrite-based barium(Ba) or strontium(Sr) and ferrous oxide ($Fe_2O_3$) as principal components, other soft magnetic materials, oxide soft magnetic materials, and the like. However, an amorphous magnetic material whose basic composition is based on Fe—Co—Si or Co—FeNi is better.

Although the shape of the magnetic wire 16 is not particularly limited if the magnetic wire has an oblong shape that is suitable for generating a large Barkhausen effect, a predetermined length is required with respect to the cross-sectional area in order to cause a large Barkhausen effect.

In addition, the magnetic wire 16 is a linear magnetic material. Here, the linear shape (wire shape) is a concept including shapes provided such that circular, rectangular, and other shapes as cross-sectional shapes (shapes that are cut along a direction that crosses the longitudinal direction of a magnetic wire body 14) extend in the shape of a straight line or in the shape of a curve.

In order to cause a large Barkhausen effect, the diameter of the magnetic wire 16 may be equal to or more than 10 μm.

In order to cause a large Barkhausen effect, the length of the magnetic wire 16 may be equal to or more than 10 mm.

The surface of the magnetic wire 16 may be subjected to insulating processing with insulating materials, such as ceramics or glass, for example, in order to increase the output of a pulse signal.

Other constituent elements will be described.

In the label 101 related to the present exemplary embodiment, a hidden layer (not shown) may be provided between the base 12 and the adhesion layer 14. By providing the hidden layer, the magnetic wire 16 buried in the adhesion layer 14 is does not easily become visible.

The hidden layer is not particularly limited if the hidden layer has a hiding property (shielding property).

The hidden layer is formed by, for example, a method of coating and printing an opaquer on the rear surface (surface on the adhesion layer 14 side) of the base 12, a method of mixing a pigment or the like with an adhesive to applying the resulting mixture, or the like.

In addition, a pigment or the like may be mixed with an adhesive that constitutes the adhesion layer 14, thereby giving a hiding function to the adhesion layer 14 to use the adhesion layer 14 as an adhesive shield layer.

The thickness of the shield layer may be, for example, 2 μm or more and 40 μm or less.

The label 101 related to the present exemplary embodiment described above is adhered to an object to be adhered after being provided by cutting out to a predetermined size (length along the longitudinal direction of the label 101), for example, using a label cutter.

Here, in the related art, in the cutting-out of the label 101 by the label cutter (for example, a device adhered to an adhesion target while cutting out the label 101 to a predetermined size (length), the hardness of the metal magnetic wire 16 is high compared to the base 12 and the adhesion layer 14 made of paper or resin. Therefore, poor cutting of the magnetic wire 16 may occur.

Thus, in the label 101 related to the present exemplary embodiment, the cut portion 18 provided by cutting out the label body 10 and the magnetic wire 16 is provided in advance. Since the cut portion 18 is provided except for a portion (both ends in the present exemplary embodiment) of the label body 10 in the width direction, the label 101 does not separate with the cut portion 18 as a border.

For this reason, when the label 101 is adhered to an object to be adhered, the label 101 is cut out along the cut portion 18 in which the magnetic wire 16 is cut in advance, whereby poor cutting of the magnetic wire 16 by the label cutter is suppressed.

Additionally, since it is not necessary to cut the magnetic wire 16 in the cutting of the label 101 by the label cutter, edge nicking of the label cutter is also suppressed.

Particularly, in the label 101 related to the present exemplary embodiment, the cut portion 18 is provided except for both ends of the label body 10 in the width direction, whereby the belt-like label 101 is brought into a connected state at both the ends. Thereby, winding into a roll is stably realized.

In addition, although the form in which the cut portion 18 is provided by cutting the magnetic wire 16 except for both ends of the label body 10 in the width direction has been described in the label 101 related to a first exemplary embodiment, the invention is not limited thereto, and any arbitrary forms in which the cut portion 18 is provided except for a portion of the label body 10 in the width direction may be adopted.

Even when the cut portion 18 is provided except for a portion of the label body 10 in the width direction, poor cutting of the magnetic wire 16 by the label cutter is suppressed like a case where the cut portion is provided except for both the ends.

Additionally, the label 101 related to the first exemplary embodiment may have a form in which the cut portion 18 is provided according to the arrangement position of the magnetic wire 16 of the label body 10. That is, a form in which the cut portion 18 that divides the whole label body 10 is provided only near the arrangement position of the magnetic wire 16 in the label body 10 (that is, for example, a form in which the cut portion 18 is provided only near the arrangement position of the magnetic wire 16 in the label body 10 according to the arrangement position and of the magnetic wire 16 and the number of magnetic wires in the width direction of the label body 10. Thereby, poor cutting of the magnetic wire 16 by the label cutter is suppressed similarly to the case where the cut portion is provided except for both the ends.

Specifically, the following forms are included.

Figure 8:
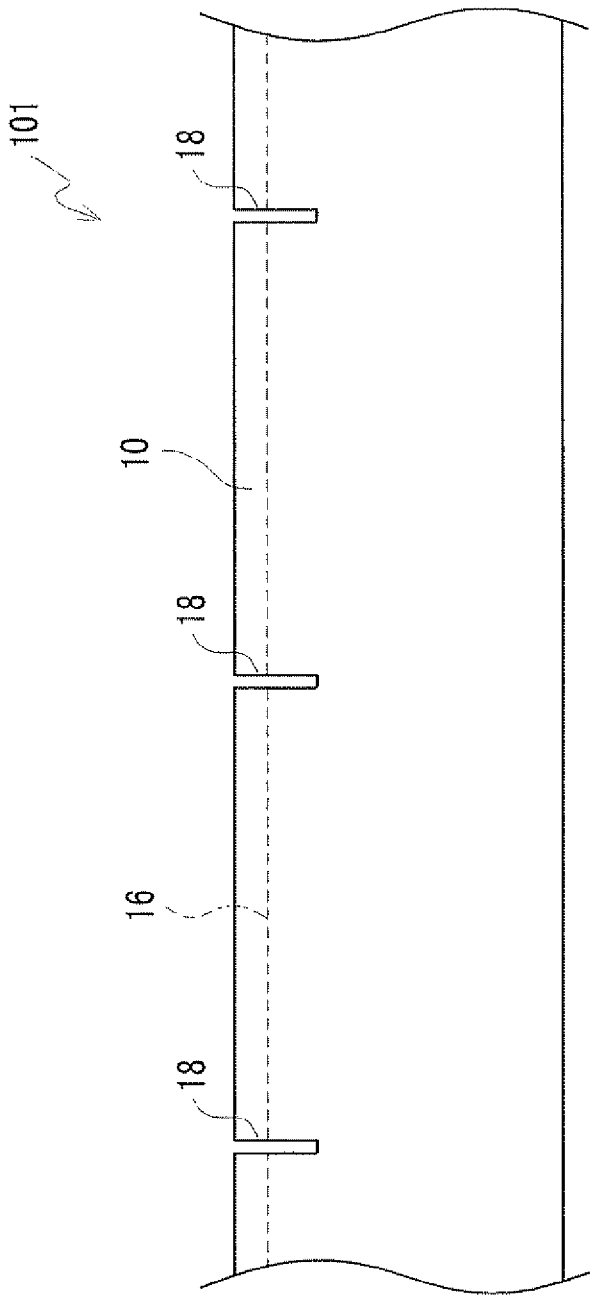
FIG. 8 is a plane view showing still another label related to the first exemplary embodiment.

1) As shown in FIG. 8, for example, the label 101 in which the magnetic wire 16 (one magnetic wire 16) is provided at one end of the label body 10 in the width direction along the longitudinal direction of the label body 10 and in which the cut portion 18 is provided only at one end of the label body 10 in the width direction according to the arrangement position of the magnetic wire 16.

Figure 9:
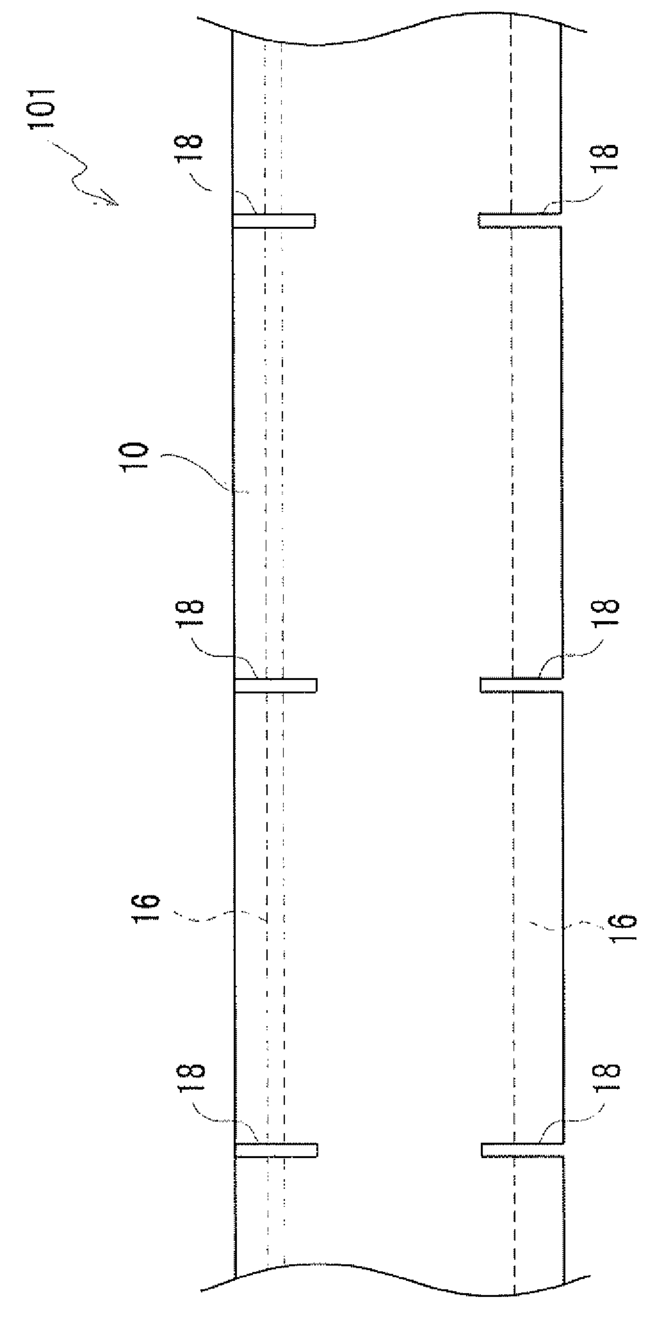
FIG. 9 is a plane view showing still another label related to the first exemplary embodiment.

2) As shown in FIG. 9, for example, the label 101 in which the magnetic wires 16 (two magnetic wires 16) are respectively provided at both ends of the label body 10 in the width direction along the longitudinal direction of the label body 10 and in which the cut portions 18 are respectively provided only at both ends of the label body 10 in the width direction according to the arrangement position of the magnetic wires 16.

Figure 10:
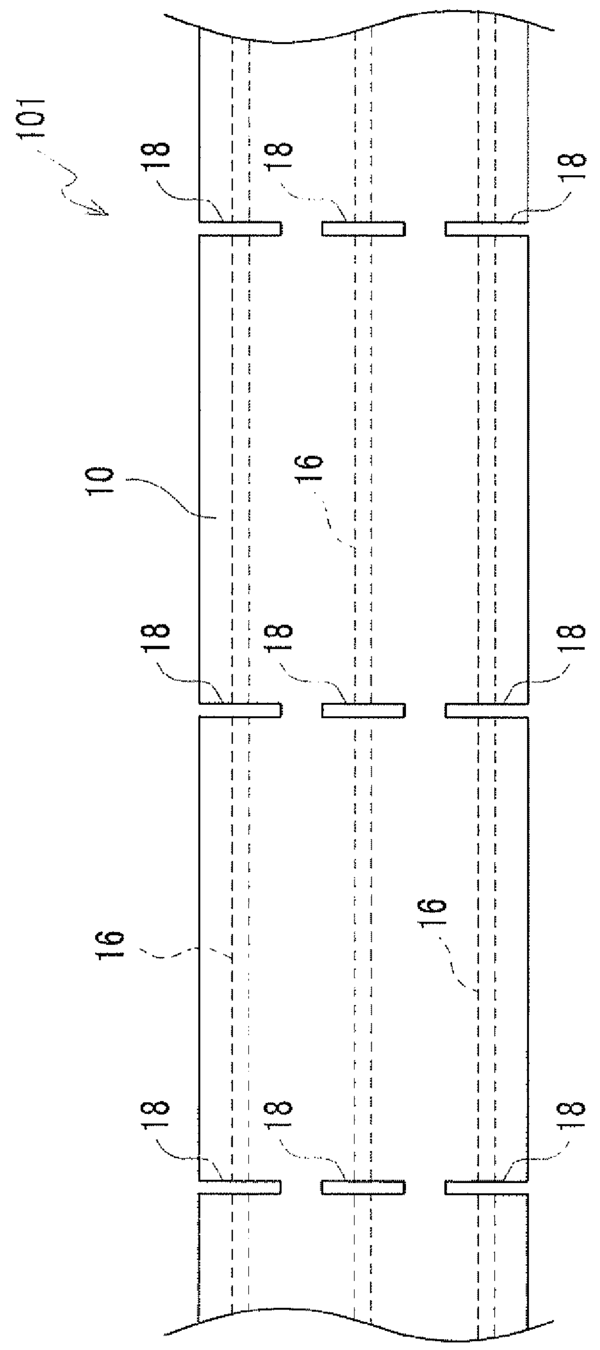
FIG. 10 is a plane view showing still another label related to the first exemplary embodiment.

3) As shown in FIG. 10, for example, the label 101 in which the magnetic wires 16 (three magnetic wires 16) are respectively provided at both ends and central portion of the label body 10 in the width direction along the longitudinal direction of the label body 10 and in which the cut portions 18 are respectively provided only at both ends and central portion of the label body 10 in the width direction according to the arrangement position of the magnetic wires 16.

Figure 11:
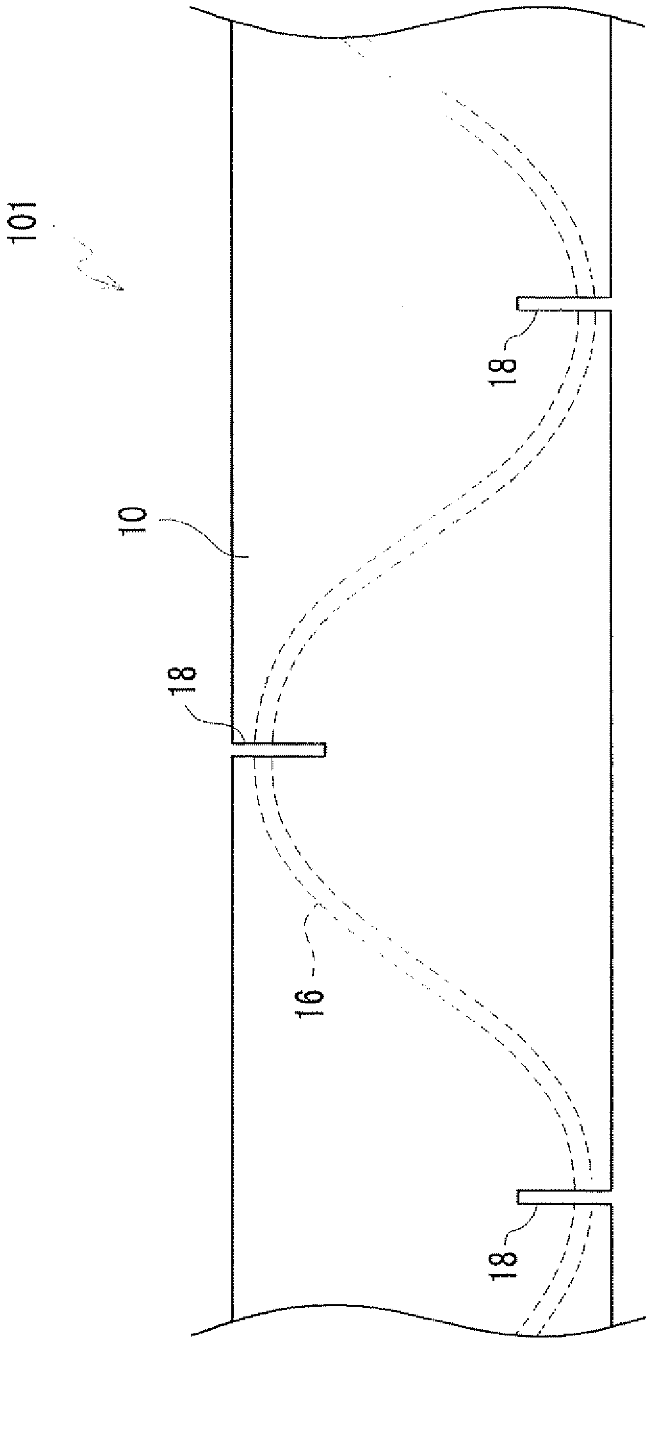
FIG. 11 is a plane view showing still another label related to the first exemplary embodiment.

4) As shown in FIG. 11, for example, the label 101 in which the magnetic wire 16 is arranged in a curved or bent manner in the label body 10 (the magnetic wire 16 is arranged in a curved manner in FIG. 11) and in which the cut portion 18 is provided at a portion where the magnetic wire 16 is closest to the end of the label body 10 in the width direction.

Figure 12:
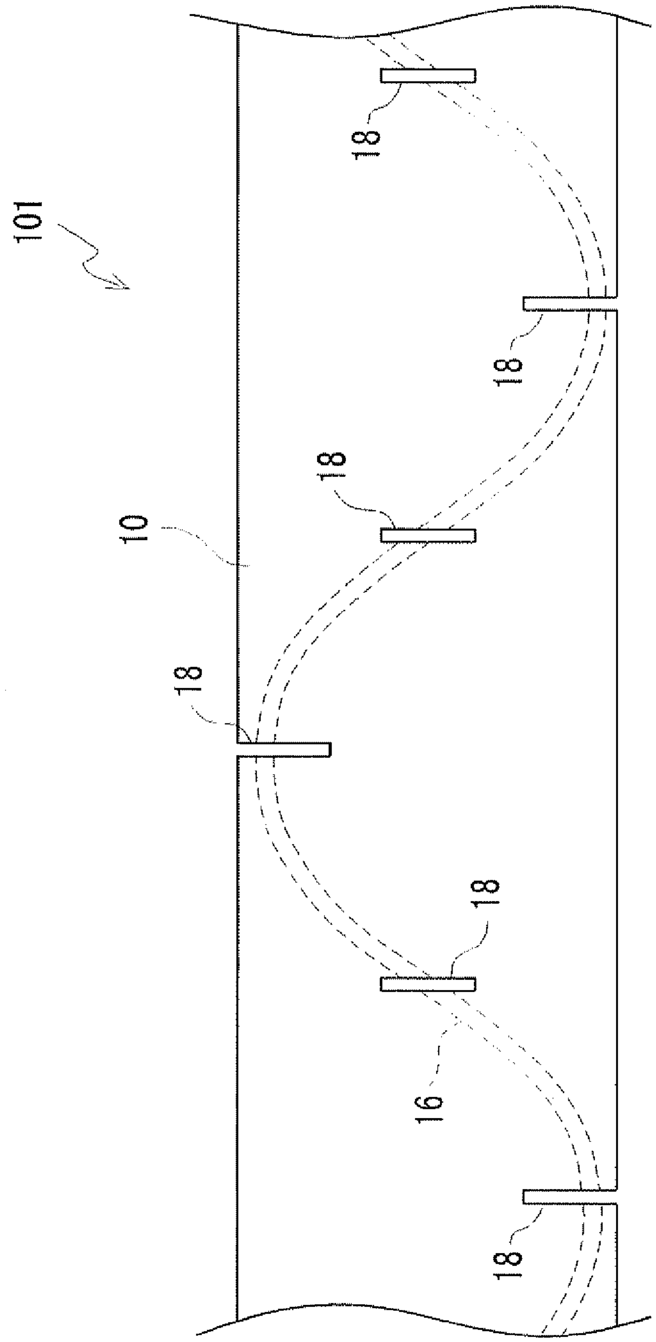
FIG. 12 is a plane view showing still another label related to the first exemplary embodiment.

5) As shown in FIG. 12, for example, the label 101 in which the magnetic wire 16 is arranged in a curved or bent manner in the label body 10 (the magnetic wire 16 is arranged in a curved manner in FIG. 12) and in which the cut portions 18 are provided at a portion where the magnetic wire 16 is closest to the end of the label body 10 in the width direction, and at a portion where the magnetic wire 16 is located at the central portion of the label body 10 in the width direction.

In addition, in the labels 101 shown in FIGS. 8 to 10, the arrangement position and number of the magnetic wire(s) 16 in the width direction of the label body 10 is not necessarily limited to these. For example, the magnetic wire 16 may be provided between the end and central portion of the label body 10 in the width direction, or four or more magnetic wires 16 may be provided. The cut portions 18 may be provided only near the arrangement position of the magnetic wire 16 in the label body 10 according to the arrangement position and number of the magnetic wires 16 in the width direction of the label body 10.

Additionally, in the labels 101 shown in FIGS. 11 to 12, the position of the cut portion(s) 18 is not necessarily limited to this. For example, the cut portion(s) 18 may be provided only near the arrangement position of the magnetic wire 16 in the label body 10 according to the arrangement position of the magnetic wire 16 in the width direction of the label body 10 so as to be provided at an arbitrary portion, such as providing the magnetic wire 16 only at a portion located at the central portion of the label body 10 in the width direction.

Second Embodiment

Figure 6:
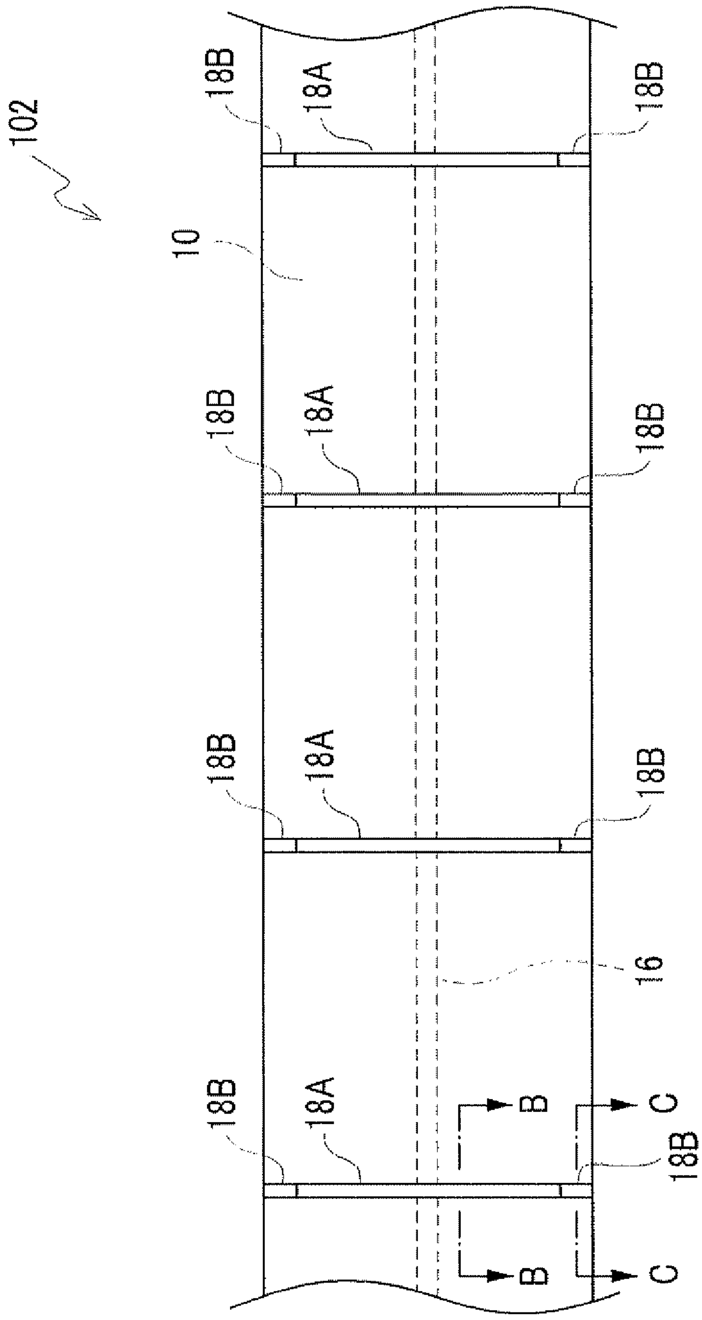
FIG. 6 is a plane view showing a label related to a second exemplary embodiment.
Figure 7B:
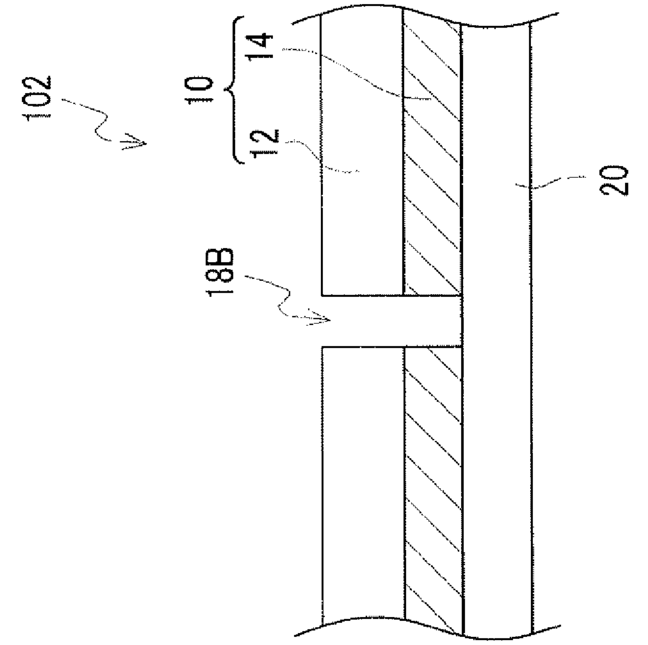
FIGS. 7A and 7B are cross-sectional views showing the label related to the second exemplary embodiment.
Figure 7A:
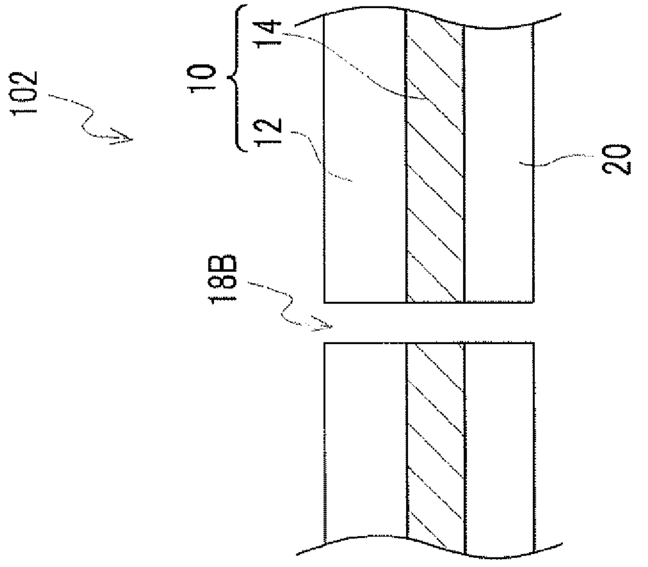

FIG. 6 is a plane view showing a label related to a second exemplary embodiment. FIGS. 7A and 7B are cross-sectional views showing the label related to the second exemplary embodiment.

In addition, FIG. 7A is equivalent to a B-B cross-sectional view of FIG. 6, and FIG. 7B is equivalent to a C-C cross-sectional view of FIG. 6.

A label 102 related to the second exemplary embodiment has a form including release paper 20 that covers the adhesion layer 14 of the label body 10 in the label 101 related to the first exemplary embodiment.

Specifically, as shown in FIGS. 6 and 7, the label 102 related to the second exemplary embodiment includes, for example, the belt-like label body 10 having the base 12 and the adhesion layer 14 provided on one surface of the base 12, the magnetic wire 16 arranged in the label body 10 along the longitudinal direction of the label body 10, and the release paper 20 that covers the adhesion layer 14 of the label body 10.

The label body 10 has, for example, plural first cut portions 18A provided by cutting the label body 10, the magnetic wire 16, and the release paper 20 along the width direction of the label body 10 except for both ends of the label body 10 in the width direction, and provided at intervals in the longitudinal direction of the label body 10, and second cut portions 18B provided by cutting both ends of the label body 10 in the width direction continuously with the first cut portion 18A along the width direction of the label body 10.

Here, the first cut portion 18A is equivalent to the cut portion 18 of the label 101 related to the first exemplary embodiment (here, in the present exemplary embodiment, the first cut portion 18A also cuts the release paper 20 along with the label body 10 and the magnetic wire 16), and the specific forms thereof are the same.

On the other hand, the second cut portion 18B formed continuously with the first cut portions 18A is provided in so-called half-cut in which the label body 10 is cut and the release paper 20 is not cut.

The second cut portions 18B may be continuously provided or may be intermittently provided, along the width direction of the label body 10. The present exemplary embodiment shows a form in which the second cut portions 18B are continuously provided.

When the second cut portions 18B are intermittently provided, the release paper 20 may also be cut along with the label body 10.

The release paper 20 includes release paper obtained by subjecting a base to impregnation processing or surface processing using a release agent. The base includes, for example, high-quality paper, poly-laminate paper, kraft paper, recycled paper, coated paper, and the like. The release agent includes release agents, such as a silicone resin release agent, waxes, a higher fatty acid release agent, a higher alcohol release agent, and a higher fatty acid amide release agent, and the silicone resin release agent is better. The impregnation processing or surface processing of the release agent to the base may be performed by well-known methods.

The basis weight of the release paper 20 includes, for example, a range of 50 g/$m^2$ or more and 180 g/$m^2$ or less.

In addition, since the label 102 related to the present exemplary embodiment is the same as the label 101 related to a first exemplary embodiment except the above configuration, the description thereof is omitted.

In the label 102 related to the present exemplary embodiment described above, the first cut portion 18A provided by cutting the label body 10, the magnetic wire 16, and the release paper 20 is provided in advance similarly to the first exemplary embodiment. Therefore, poor cutting of the magnetic wire 16 by the label cutter is suppressed.

Additionally, in the label 102 related to the present exemplary embodiment, the second cut portions 18B are provided in advance continuously with the first cut portion 18A. Therefore, even when the label has the release paper 20, cutting of the label body 10 by the label cutter becomes easy.

Additionally, even in the label 102 related to the second exemplary embodiment, similarly to the cut portion 18 of the label 101 related to the first exemplary embodiment, the cut portion 18A may have a form that provides the cut portion 18 except for a portion of the label body 10 in the width direction.

Additionally, the cut portion 18A may have a form that is provided according to the arrangement position of the magnetic wire 16 in the label body 10.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A label comprising:

a belt-shaped label body having a base and an adhesion layer provided on one surface of the base, a plurality of linear magnetic materials, a plurality of first cut portions, and a plurality of second cut portions;

the linear magnetic materials disposed along a longitudinal direction of the label body, a release paper covering the adhesion layer of the label body; and the plurality of first cut portions provided as perforations in the label body, the linear magnetic materials, and the release paper along a width direction of the label body except for both ends of the label body in the width direction, and provided at intervals in the longitudinal direction of the label body, wherein the plurality of the first cut portions separate the plurality of linear magnetic materials from each other in a length direction of the magnetic materials, wherein the plurality of second cut portions are formed in both ends of the label body in the width direction, and are provided as cutting both ends of the label body in the width direction and not cutting the release paper, and wherein each of the plurality of second cut portions is formed continuously with one of the plurality of first cut portions along the width direction of the label body.

2. The label according to claim 1, wherein each of the first cut portions extends continuously between both ends of the label body.

3. The label according to claim 2, wherein each of the first cut portions are provided according to an arrangement position of the magnetic material of the label body, and the second cut portions do not intersect the position of the magnetic material of the label body.

4. The label according to claim 2, wherein the magnetic material is arranged in a bent or curved manner in the label body along the longitudinal direction of the label body.

5. The label according to claim 2, wherein each of the first cut portions extends continuously between both ends of the label body to cover at least 50% of a width of the label body.

6. The label according to claim 1, wherein each of the first cut portions are provided according to an arrangement position of the magnetic material of the label body, and the second cut portions do not intersect the position of the magnetic material of the label body.

7. The label according to claim 1, wherein the magnetic material is arranged in a bent or curved manner in the label body along the longitudinal direction of the label body.

8. The label according to claim 1, wherein an edge of one of the plurality of magnetic materials contacts with one of the plurality of first cut portions.

9. The label according to claim 1, wherein a diameter of each of the magnetic materials is equal to or greater than 10 μm, and a length of each of the magnetic materials is equal to or greater than 10 mm.

10. The label according to claim 1, wherein each of the plurality of second cut portions is formed to extend continuously between a pair of the first cut portions along the width direction of the label body.

11. A label comprising:

a belt-shaped label body having a base and an adhesion layer provided on one surface of the base, a plurality of linear magnetic materials, a plurality of first cut portions, and a plurality of second cut portions;

the linear magnetic materials being disposed along a longitudinal direction of the label body;

a release paper covering the adhesion layer of the label body; and the plurality of first cut portions provided as perforations in the label body, the linear magnetic materials, and the release paper along a width direction of the label body except for both ends of the label body in the width direction, and provided at intervals in the longitudinal direction of the label body, wherein each of the plurality of second cut portions is formed continuously with one of the plurality of first cut portions along the width direction of the label body, wherein one of the plurality of linear magnetic materials is arranged between one of the plurality of first cut portions and another one of the first plurality of cut portions, and wherein the plurality of the first cut portions separate the plurality of linear magnetic materials from each other in a length direction of the magnetic materials.

12. The label according to claim 11, wherein each of the plurality of second cut portions is formed to extend continuously between a pair of the first cut portions along the width direction of the label body.

* * * * *